United States Patent
Wei et al.

(10) Patent No.: US 11,616,636 B2
(45) Date of Patent: Mar. 28, 2023

(54) HASH UPDATING METHODS AND APPARATUSES OF BLOCKCHAIN INTEGRATED STATION

(71) Applicant: ALIPAY (HANGZHOU) INFORMATION TECHNOLOGY CO., LTD., Zhejiang (CN)

(72) Inventors: Changzheng Wei, Hangzhou (CN); Ying Yan, Hangzhou (CN); Peng Wu, Hangzhou (CN); Hui Zhang, Hangzhou (CN); Changhua He, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,639

(22) Filed: Jun. 29, 2021

(65) Prior Publication Data

US 2021/0328767 A1 Oct. 21, 2021

(30) Foreign Application Priority Data

Jul. 8, 2020 (CN) .......................... 202010653793.2

(51) Int. Cl.
*H04L 9/00* (2006.01)
*G06F 21/53* (2013.01)
(Continued)

(52) U.S. Cl.
CPC .............. *H04L 9/008* (2013.01); *G06F 21/53* (2013.01); *H04L 9/0869* (2013.01); *H04L 9/30* (2013.01);
(Continued)

(58) Field of Classification Search
CPC ......... H04L 9/008; H04L 9/0869; H04L 9/30; H04L 9/3236; G06F 21/53; G06F 2221/033
See application file for complete search history.

(56) References Cited

U.S. PATENT DOCUMENTS 7,529,919 B2   5/2009   Lampson et al.
8,116,455 B1   2/2012   Sussland et al.
(Continued)

FOREIGN PATENT DOCUMENTS

CN   104200154   12/2014
CN   105320891   2/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Yonas A Bayou
(74) *Attorney, Agent, or Firm* — Fish & Richardson P.C.

(57) ABSTRACT

A cryptographic acceleration card included in a blockchain integrated station sends negotiation information to a provider of a new disk image, where the negotiation information is used by the provider to determine a deployment key, and where the new disk image is used to update an old disk image included in the blockchain integrated station. The cryptographic acceleration card receives a new hash value encrypted by the provider using the deployment key, where the new hash value corresponds to the new disk image. The cryptographic acceleration card replaces an old hash value corresponding to the old disk image with the new hash value, where the new hash value is compared with a current hash value of a disk image included in the blockchain integrated station to determine whether the disk image matches the new disk image.

20 Claims, 6 Drawing Sheets

(51) Int. Cl.
*H04L 9/08* (2006.01)
*H04L 9/32* (2006.01)
*H04L 9/30* (2006.01)

(52) U.S. Cl.
CPC ...... *H04L 9/3236* (2013.01); *G06F 2221/033* (2013.01)

(56) References Cited

U.S. PATENT DOCUMENTS

| | | | |
|---|---|---|---|
| 8,171,285 | B2 | 5/2012 | Platt |
| 8,239,686 | B1 | 8/2012 | Hodzic et al. |
| 9,009,840 | B1 | 4/2015 | Stickle |
| 9,336,395 | B2 | 5/2016 | Berlin |
| 9,634,951 | B1 | 4/2017 | Hunt et al. |
| 10,075,439 | B1 | 9/2018 | Mullens et al. |
| 10,313,257 | B1 | 6/2019 | Hunt et al. |
| 10,642,984 | B2 | 5/2020 | Heagney |
| 11,144,652 | B1 | 10/2021 | Cochell et al. |
| 2003/0074567 | A1 | 4/2003 | Charbonneau |
| 2003/0196110 | A1 | 10/2003 | Lannpson et al. |
| 2006/0015717 | A1 | 1/2006 | Liu et al. |
| 2006/0026569 | A1 | 2/2006 | Oerting et al. |
| 2006/0150256 | A1 | 7/2006 | Fanton et al. |
| 2007/0118730 | A1 | 5/2007 | Platt |
| 2008/0256363 | A1 | 10/2008 | Balacheff et al. |
| 2009/0249324 | A1 | 10/2009 | Brar et al. |
| 2012/0084414 | A1 | 4/2012 | Brock et al. |
| 2014/0013325 | A1 | 1/2014 | Shimoni et al. |
| 2014/0181057 | A1 | 6/2014 | Euresti et al. |
| 2014/0181975 | A1 | 6/2014 | Spernow et al. |
| 2014/0215196 | A1 | 7/2014 | Berlin |
| 2015/0067805 | A1 | 3/2015 | Martin |
| 2016/0070934 | A1 | 3/2016 | Frank et al. |
| 2016/0103689 | A1 | 4/2016 | Sanghi et al. |
| 2016/0366229 | A1 | 12/2016 | Yamaura et al. |
| 2017/0099604 | A1 | 4/2017 | Raleigh et al. |
| 2017/0147356 | A1 | 5/2017 | Kotary et al. |
| 2017/0235950 | A1 | 8/2017 | Gopalapura Venkatesh et al. |
| 2017/0295023 | A1* | 10/2017 | Madhavan ............ H04L 9/3247 |
| 2018/0103018 | A1 | 4/2018 | Chauhan et al. |
| 2018/0198620 | A1 | 7/2018 | Pearson |
| 2018/0225459 | A1 | 8/2018 | Zarakas et al. |
| 2018/0314827 | A1 | 11/2018 | Wells et al. |
| 2018/0367528 | A1* | 12/2018 | Schwarz ................ H04L 63/08 |
| 2019/0065709 | A1 | 2/2019 | Salomon |
| 2019/0278925 | A1 | 9/2019 | Ely |
| 2019/0305957 | A1 | 10/2019 | Reddy et al. |
| 2019/0306173 | A1 | 10/2019 | Reddy et al. |
| 2019/0340379 | A1 | 11/2019 | Beecham |
| 2019/0394648 | A1 | 12/2019 | Tipton et al. |
| 2020/0012527 | A1 | 1/2020 | Hartsock |
| 2020/0136808 | A1 | 4/2020 | Chasko et al. |
| 2020/0159625 | A1 | 5/2020 | Hutcheson et al. |
| 2020/0160289 | A1 | 5/2020 | Mahajan et al. |
| 2020/0204510 | A1* | 6/2020 | Pierce .................. G06F 40/205 |
| 2020/0322153 | A1* | 10/2020 | Cai ..................... H04W 12/104 |
| 2020/0341702 | A1* | 10/2020 | Kosaka ................ G06F 3/1222 |
| 2020/0412521 | A1 | 12/2020 | Shi |
| 2021/0037060 | A1* | 2/2021 | Robison ............ H04L 63/0876 |
| 2021/0099311 | A1* | 4/2021 | Saponaro ............ H04L 9/3247 |
| 2021/0167971 | A1 | 6/2021 | Zhang |
| 2021/0279072 | A1 | 9/2021 | Lee et al. |
| 2021/0328773 | A1 | 10/2021 | Wei et al. |
| 2021/0344506 | A1 | 11/2021 | Wei et al. |

FOREIGN PATENT DOCUMENTS

| | | | | |
|---|---|---|---|---|
| CN | 106156635 | | 11/2016 | |
| CN | 106295318 | | 1/2017 | |
| CN | 106506163 | | 3/2017 | |
| CN | 106599729 | | 4/2017 | |
| CN | 107077557 | | 8/2017 | |
| CN | 108229142 | A | 6/2018 | |
| CN | 108305072 | | 7/2018 | |
| CN | 108305072 | A * | 7/2018 | ....... G06Q 20/38215 |
| CN | 108648079 | | 10/2018 | |
| CN | 109309651 | | 2/2019 | |
| CN | 109375944 | | 2/2019 | |
| CN | 109491694 | | 3/2019 | |
| CN | 109634619 | | 4/2019 | |
| CN | 109685502 | | 4/2019 | |
| CN | 109784058 | | 5/2019 | |
| CN | 109788032 | | 5/2019 | |
| CN | 110149316 | | 8/2019 | |
| CN | 110149316 | A * | 8/2019 | ......... H04L 63/0428 |
| CN | 110287170 | | 9/2019 | |
| CN | 110502268 | | 11/2019 | |
| CN | 110535654 | | 12/2019 | |
| CN | 110535938 | | 12/2019 | |
| CN | 110852734 | | 2/2020 | |
| CN | 110855791 | | 2/2020 | |
| CN | 110855791 | A * | 2/2020 | ........... H04L 63/205 |
| CN | 110989994 | | 4/2020 | |
| CN | 110995480 | A * | 4/2020 | ......... H04L 41/0803 |
| CN | 111143854 | | 5/2020 | |
| CN | 111259348 | A | 6/2020 | |
| CN | 111277553 | A | 6/2020 | |
| CN | 111414612 | | 7/2020 | |
| CN | 111581277 | A * | 8/2020 | ............. G06F 16/27 |
| EP | 3107246 | | 12/2016 | |
| EP | 3628087 | A2 | 4/2020 | |
| WO | WO 2016107394 | | 7/2016 | |
| WO | WO 2018081583 | | 5/2018 | |
| WO | 2019120315 | A2 | 6/2019 | |

OTHER PUBLICATIONS

Nakamoto, "Bitcoin: A Peer-to-Peer Electronic Cash System," www.bitcoin.org, 2005, 9 pages.
Extended European Search Report in European Appln No. 21179695.8, dated Nov. 17, 2021, 8 pages.
Extended European Search Report in European Appln. No. 21181654.1, dated Dec. 8, 2021, 10 pages.
Extended European Search Report in European Appln. No. 21182249.9, dated Dec. 6, 2021, 8 pages.
Gheorghe et al., "Decentralized Storage System for Edge Computing," 2019 18th International Symposium on Parallel and Distributed Computing (ISPDC), IEEE, Jun. 2019, 41-49.
Khan et al., "A Blockchain-Based Secure Image Encryption Scheme for the Industrial Internet of Things," Entropy, Feb. 2020, 22(2):1-26.
Menezes et al., Handbook of Applied Cryptography, 1st ed., CRC Press, Dec. 1997, Chapter 12, 54 pages.
Platt et al., "Towards Blockchain for Decentralized Self-Organizing Wireless Networks," 2019 IEEE Globecom Workshops (GC Wkshps), IEEE, Dec. 2019, 1-5.
Xu et al., "Comments on the SM2 Key Exchange Protocol," ICIAP: International Conference on Image Analysis and Processing, 17th International Conference, Dec. 10, 2011, 160-171.

* cited by examiner

Send, by a cryptographic acceleration card assembled on a blockchain integrated station, negotiation information to a provider of a new version of disk image, wherein the negotiation information is used respectively by the provider and the cryptographic acceleration card to determine a deployment key, and the new version of disk image is used to update an old version of disk image deployed in the blockchain integrated station — 102

Receive, by the cryptographic acceleration card, a new hash value encrypted by the provider using the deployment key, wherein the new hash value corresponds to the new version of disk image — 104

Replace, by the cryptographic acceleration card, a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station — 106

FIG. 1

In response to negotiation information sent by a cryptographic acceleration card assembled on a blockchain integrated station, forwarding, by the blockchain integrated station, the negotiation information to a provider of a new version of disk image, such that the provider and the cryptographic acceleration card respectively determine a deployment key based on the negotiation information, wherein the new version of disk image is used to update an old version of disk image deployed in the blockchain integrated station ⎯202

Forwarding, by the blockchain integrated station, a new hash value corresponding to the new version of disk image and encrypted by the provider using the deployment key to the cryptographic acceleration card, such that the cryptographic acceleration card replaces a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station ⎯204

FIG. 2

HASH UPDATING METHODS AND APPARATUSES OF BLOCKCHAIN INTEGRATED STATION

CROSS-REFERENCE TO RELATED APPLICATIONS

This application claims priority to Chinese Patent Application No. 202010653793.2, filed on Jul. 8, 2020, which is hereby incorporated by reference in its entirety.

TECHNICAL FIELD

The present disclosure relates to the field of blockchain technologies, and in particular to hash updating methods and apparatuses of a blockchain integrated station

BACKGROUND

Blockchain technology (also called distributed ledger technology) is a decentralized distributed database technology having many characteristics such as decentralization, openness, transparency, immutability and trustability and the like, and thus it is applicable to many application scenarios with high demands for data reliability.

SUMMARY

In view of this, one or more embodiments of the present disclosure provide hash updating methods and apparatuses of a blockchain integrated station.

To achieve the above-mentioned object, one or more embodiments of the present disclosure provide the following technical solution.

According to a first aspect of one or more embodiments of the present disclosure, provided is a hash updating method of a blockchain integrated station, including:

sending, by a cryptographic acceleration card assembled on the blockchain integrated station, negotiation information to a provider of a new version of disk image, where the negotiation information is used respectively by the provider and the cryptographic acceleration card to determine a deployment key, and the new version of disk image is used to update an old version of disk image deployed in the blockchain integrated station;

receiving, by the cryptographic acceleration card, a new hash value encrypted by the provider using the deployment key, wherein the new hash value corresponds to the new version of disk image;

replacing, by the cryptographic acceleration card, a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station.

According to a second aspect of one or more embodiments of the present disclosure, provided is a hash updating method of a blockchain integrated station, including:

in response to negotiation information sent by a cryptographic acceleration card assembled on the blockchain integrated station, forwarding, by the blockchain integrated station, the negotiation information to a provider of a new version of disk image, such that the provider and the cryptographic acceleration card respectively determine a deployment key based on the negotiation information, wherein the new version of disk image is used to update an old version of disk image deployed in the blockchain integrated station;

forwarding, by the blockchain integrated station, a new hash value corresponding to the new version of disk image and encrypted by the provider using the deployment key to the cryptographic acceleration card, such that the cryptographic acceleration card replaces a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station.

According to a third aspect of one or more embodiments of the present disclosure, provided is a hash updating apparatus of a blockchain integrated station, including:

a negotiating module, configured to enable a cryptographic acceleration card assembled on the blockchain integrated station to send negotiation information to a provider of a new version of disk image, wherein the negotiation information is used respectively by the provider and the cryptographic acceleration card to determine a deployment key, and the new version of disk image is used to update an old version of disk image deployed in the blockchain integrated station;

a receiving module, configured to enable the cryptographic acceleration card to receive a new hash value encrypted by the provider using the deployment key, wherein the new hash value corresponds to the new version of disk image; and a replacing module, configured to enable the cryptographic acceleration card to replace a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station.

According to a fourth aspect of one or more embodiments of the present disclosure, provided is a hash updating apparatus of a blockchain integrated station, including:

an information forwarding module, configured to, in response to negotiation information sent by a cryptographic acceleration card assembled on the blockchain integrated station, enable the blockchain integrated station to forward the negotiation information to a provider of a new version of disk image, such that the provider and the cryptographic acceleration card respectively determine a deployment key based on the negotiation information, wherein the new version of disk image is used to update an old version of disk image deployed in the blockchain integrated station; and a hash forwarding module, configured to enable the blockchain integrated station to forward a new hash value corresponding to the new version of disk image and encrypted by the provider using the deployment key to the cryptographic acceleration card, such that the cryptographic acceleration card replaces a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station.

According to a fifth aspect of one or more embodiments of the present disclosure, provided is a cryptographic acceleration card, including:

a processor; and a memory for storing processor executable instructions;

where the processor implements the method according to the first aspect by running the executable instructions.

According to a sixth aspect of one or more embodiments of the present disclosure, provided is a blockchain integrated station, including:

a processor; and a memory for storing processor executable instructions;

where the processor implements the method according to the second aspect by running the executable instructions.

According to a seventh aspect of one or more embodiments of the present disclosure, provided is a computer readable storage medium having computer instructions stored thereon, where the instructions are executed by a processor to implement steps in the method according to the first or second aspect.

BRIEF DESCRIPTION OF THE DRAWINGS

FIG. 1 is a flowchart of a hash updating method of a blockchain integrated station according to example embodiments of the present disclosure.

FIG. 2 is a flowchart of another hash updating method of a blockchain integrated station according to example embodiments of the present disclosure.

DETAILED DESCRIPTION OF THE EMBODIMENTS

Figure 3:
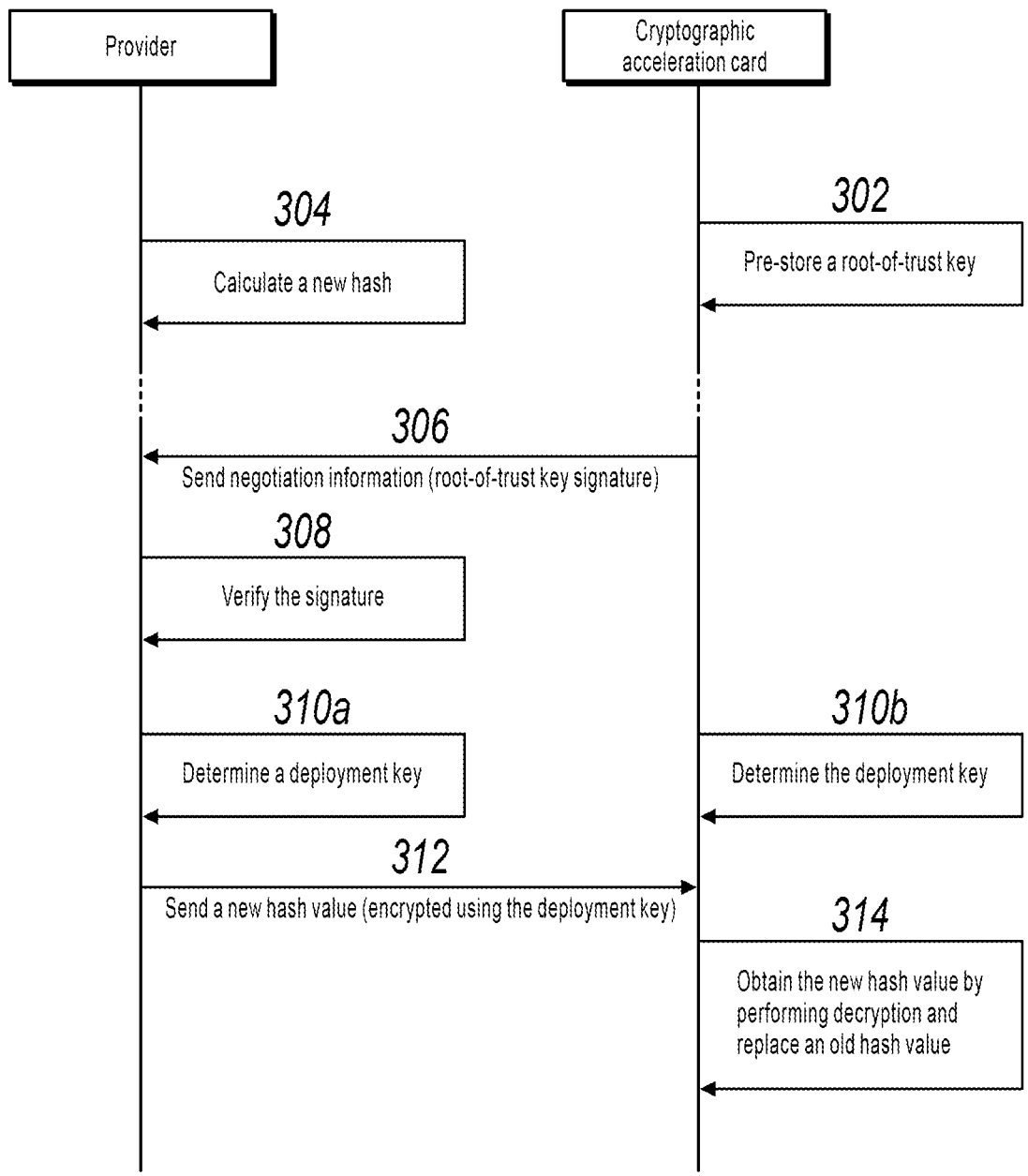
FIG. 3 is an interaction flowchart of a hash updating method of a blockchain integrated station according to example embodiments of the present disclosure.

Example embodiments will be described in detail herein with the example embodiments thereof expressed in the drawings. When the following descriptions involve the drawings, same numbers in different drawings represent same or similar elements unless stated otherwise. The implementations described in the following example embodiments do not represent all implementations consistent with one or more embodiments of the present disclosure. On the contrary, they are merely embodiments of apparatuses and methods consistent with some aspects of one or more embodiments of the present disclosure described in detail in the appended claims.

It should be noted that the steps of corresponding method are not necessarily performed according to the sequence shown in the present disclosure in other embodiments. In some other embodiments, the steps included in the corresponding method can be more or less than described in the specification. Further, a single step described in the specification may be divided into several steps for descriptions in other embodiments while several steps described in the specification may be combined into a single step for descriptions in other embodiments.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices (for example, PC) participating in the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, it is necessary to perform further architecture upgrade to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the above-mentioned software-hardware integration.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the above-mentioned negotiation information.

The negotiated key can include an image deployment key, and thus the provider can encrypt and transmit a binary disk image needed by the blockchain node to the smart contract processing chip based on the image deployment key, and the smart contract processing chip can decrypt and deploy the binary disk image based on the image deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encryption and transmission for a blockchain transaction by using the node public key, and the blockchain node can perform decryption by using the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted status unless processed by the smart contract processing chip. Therefore, the smart contract processing chip actually forms a Trusted Execution Environment (TEE) of hardware on the blockchain integrated station, so as to ensure the data requiring privacy protection such as transactions, contract codes, and contract status will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example, transaction processing, and storage processing and the like. Compared with other components (for example, CPU) on the blockchain integrated station, the intelligent network card is closer to the network regardless of physical level or logical level, so the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not required to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high-speed cryptographic acceleration card can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above-mentioned can be maintained in the cryptographic acceleration card, and the cryptographic acceleration card can perform signature operation based on the hardware roof-of-trust key and replace or assist the smart contract processing chip to complete the operations such as the key negotiation as described above-mentioned. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the above-mentioned smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network among a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

Based on a unified software logic, the cryptographic acceleration card assembled on the blockchain integrated station can realize the process of updating a self-stored old hash value corresponding to an old version of disk image. In this updating process, the cryptographic acceleration card firstly determines a deployment key together with a provider of a new version of disk image (hereinafter called provider for short) through negotiation information, and then a new hash value corresponding to the new version of disk image is encrypted and transmitted to the cryptographic acceleration card from both sides and finally, the cryptographic acceleration card replaces the locally-stored old hash value with the new hash value obtained through decryption, thereby the old hash value is updated. The process will be described below in combination with accompanying drawings.

FIG. 1 is a flowchart of a hash updating method of a blockchain integrated station according to example embodiments of the present disclosure. The method is applied to a cryptographic acceleration card assembled on the blockchain integrated station. In order to distinguish from the blockchain integrated station that includes the cryptographic acceleration card, the blockchain integrated station in the subsequent descriptions of the present disclosure can be understood as a CPU of the blockchain integrated station, or another component other than the cryptographic acceleration card assembled in the blockchain integrated station. As shown in FIG. 1, the method can include the following steps.

At step 102, the cryptographic acceleration card assembled on the blockchain integrated station sends negotiation information to a provider of a new version of disk image, where the negotiation information is respectively used by the provider and the cryptographic acceleration card to determine a deployment key, and the new version of disk image is used to update an old version of disk image deployed in the blockchain integrated station.

In this embodiment, a disk image (that has not been executed yet) is locally pre-deployed in the blockchain integrated station. The specific form of the disk image is not limited herein in the present disclosure. For example, the disk image can be an executable disk image, for example, an executable file of .exe format. At this time, the executable file can be pre-installed in an execution component of the blockchain integrated station, such as a hard disk drive. The disk image can also be a binary disk image, for example, a binary image of .bin format. At this time, the binary image can be pre-stored at a proper position of an execution component of the blockchain integrated station, such as a hard disk drive to be invoked and executed. Further, the disk image can be a binary disk image corresponding to a blockchain node and deployed in the blockchain integrated station. Correspondingly, when the binary disk image is executed, the blockchain integrated station is implemented as a blockchain node, for example, realize one or more functions of blockchain visualization, contract creation and deployment, contract execution, key management and privacy computing and the like. The disk image can also be a platform disk image including the above-mentioned binary disk image corresponding to the blockchain node and deployed in the blockchain integrated station. When the platform disk image is executed, the blockchain integrated station is implemented not only as a blockchain node, but also can realize one or more other functions such as image processing, node monitoring and service monitoring, which will not be redundantly described herein.

Correspondingly, the cryptographic acceleration card currently already stored an old hash value corresponding to the old version of disk image. The solution of the present disclosure aims to replace the old hash value with a new hash value corresponding to the above-mentioned new version of disk image so as to update the old hash value, thus ensuring the hash value stored in the cryptographic acceleration card always corresponds to the new hash value.

The deployment key determined by the cryptographic acceleration card and the provider based on the above-mentioned negotiation information is used to update the old hash value corresponding to the old version of disk image and stored currently in the cryptographic acceleration card. Therefore, in an embodiment, the cryptographic acceleration card can send the above-mentioned negotiation information to the provider after determining that hash updating needs to be performed. For example, before updating a disk image, the cryptographic acceleration card can proactively send an update inquiry message to the provider and determine whether to perform hash updating based on a confirmation message returned by the provider for the update inquiry message. For example, the cryptographic acceleration card can send the above-mentioned update inquiry message to the provider when the blockchain integrated station is started for running, before the disk image is executed, or according to a predetermined period, so as to know update needs for the disk image in time. For another example, before updating the disk image, the cryptographic acceleration card can determine hash updating is needed after receiving an update notification for the disk image sent by the provider. For another example, when or after updating the disk image, the cryptographic acceleration card can determine hash updating is needed according to a detected update event of the disk image, and then send the above-mentioned negotiation information to the provider.

In an embodiment, the cryptographic acceleration card can generate the above-mentioned negotiation information in a trusted execution environment (TEE), and sign it with its own corresponding private key. For example, the cryptographic acceleration card can generate one random number S1 as its own private key and obtain a public key by performing modular exponentiation, and then sign parameters of the modular exponentiation and the above-mentioned public key by selecting a key exchange algorithm such as RSA, ECDSA or DSA or the like and then send the above-mentioned parameters, the public key and the signature to the provider in an associated manner. At this time, the above-mentioned negotiation information includes the parameters for performing modular exponentiation for the above-mentioned random number and the public key obtained by modular exponentiation. Correspondingly, after receiving the above-mentioned negotiation information, the provider can generate a random number S2 based on the above-mentioned negotiation information in a case of successful signature verification, and return a public key encrypted by the random number S2 to the cryptographic acceleration card. In this way, the cryptographic acceleration card and the provider can respectively generate a same deployment key based on the above-mentioned process. The specific process of the above-mentioned negotiation can be referred to the contents disclosed by the existing technology and will not be repeated herein.

In an embodiment, a root-of-trust key (Attestation Key) can be pre-deployed in the cryptographic acceleration card. In a key negotiation process, the cryptographic acceleration card can sign the negotiation information with the root-of-trust key. The root-of-trust key can be pre-programmed in the cryptographic acceleration card or the root-of-trust key can be deployed into the cryptographic acceleration card by a blockchain integrated station or another object in an offline secure environment. For example, when the cryptographic acceleration card is a cryptographic acceleration card based on FPGA chip, the root-of-trust key can be programmed into the FPGA chip. However, due to volatility of the FPGA chip, the stored root-of-trust key will be lost upon power down, so the cryptographic acceleration card needs to re-obtain and store the root-of-trust key after power up. To reduce the number of programming times of a client device, the FPGA structure can further include a memory connected with the FPGA chip, so that the root-of-trust key is deployed in the memory and the FPGA chip can read the root-of-trust key from the memory to realize relevant functions. Due to non-volatility of the memory, the memory can still store the root-of-trust key even upon power down, and the cryptographic acceleration card only needs to re-read the root-of-trust key from the memory to the FPGA chip after power up, without re-obtaining and re-programming. The above-mentioned memory can have several forms, for example, can be a re-writable non-volatile memory such as flash memory, or can be a non-rewritable memory such as fuse memory, which will not be limited herein.

The above-mentioned the root-of-trust key is an asymmetric key and a public key corresponding to the root-of-trust key is disclosed or maintained only by the provider. In this case, even if the root-of-trust key is not deployed (pre-built, or deployed by another object) by the provider, the provider can still verify, by using the disclosed public key, a signature generated by the root-of-trust key. The provider and the cryptographic acceleration card can realize key negotiation using the root-of-trust key: during the key negotiation process, the cryptographic acceleration card can sign the above-mentioned negotiation information using the above-mentioned root-of-trust key, so that the provider performs verification using the public key corresponding to the root-of-trust key maintained by itself, thus ensuring the privacy of the negotiation information during transmission process.

Further, the deployment key determined respectively by the cryptographic acceleration card and the provider can be directly obtained by the cryptographic acceleration card and the provider through key negotiation, that is, the deployment key is a secret value (or, master key); or, the deployment key can respectively be derived from the above-mentioned secret value by the cryptographic acceleration card and the provider through a key derivation function. Based on the above-mentioned process, the provider and the cryptographic acceleration card can complete key negotiation such that the provider and the cryptographic acceleration card can respectively obtain the same deployment key.

Further, when the new hash value is encrypted and transmitted using the deployment key determined in the above-mentioned key negotiation process, the provider and the cryptographic acceleration card can store the above-mentioned deployment key in their respective TEEs after occurrence of the first negotiation, so that the deployment key can be used in subsequent transmission of the new hash value (corresponding to disk image update). Thus, the deployment key negotiated in one time can be used several times, thereby reducing the workload of the key negotiation and improving the usage efficiency of the key. When a same pair of deployment keys are used a plurality of times, the risk of leakage of the keys can be increased correspondingly. As a result, to avoid leakage of the keys, an upper limit number of usage times or a valid time length can be set for the negotiated deployment key. Key negotiation can also be performed temporarily every time the new hash value is transmitted in a scenario with high security requirements, and the negotiated deployment key is discarded after each use to ensure the deployment key is not leaked. In this embodiment, key negotiation is performed based on the pre-deployed root-of-trust key, which not only ensures the privacy of the new hash value in transmission process but also reduces the possibility that the root-of-trust key of the cryptographic acceleration card is leaked, thereby improving the security of the cryptographic acceleration card.

At step 104, the cryptographic acceleration card receives a new hash value encrypted by the provider using the deployment key, where the new hash value corresponds to the new version of disk image.

In an embodiment, an old hash value currently stored in the cryptographic acceleration card can be obtained through calculation by the provider in a TEE according to an old version of disk image provided by the provider. Similarly, the new hash value for replacing the old hash value can also be obtained through calculation by the provider according to the new version of disk image for updating the old version of disk image. The above-mentioned TEE corresponding to the provider can be constructed by adopting any technique of related technologies, and the old hash value and the new hash value can be calculated by the provider by adopting any hash algorithm of related technologies, which is not limited herein. A hash algorithm adopted to calculate the old hash value according to the old version of disk image can be identical to or different from a hash algorithm adopted to calculate the new hash value according to the new version of disk image, which is not limited herein.

In an embodiment, the cryptographic acceleration card can encrypt the new hash value obtained in the above-mentioned calculation process by using the deployment key determined in the above-mentioned key negotiation process and then transmit the encrypted new hash value to the cryptographic acceleration card, thus ensuring the privacy of the new hash value in transmission process. For example, the provider can transmit the encrypted new hash value directly to the cryptographic acceleration card to reduce the possibility of information leakage of the new hash value in the transmission process; or, in a case of inability to perform direct communication with the cryptographic acceleration card due to unavailability of a network address of the cryptographic acceleration card and the like, the provider can also firstly send the encrypted new hash value to the blockchain integrated station which then forwards the encrypted new hash value to the cryptographic acceleration card.

At step 106, the cryptographic acceleration card replaces the stored old hash value corresponding to the old version of disk image with the new hash value, where the new hash value is used to be compared with a current hash value of a disk image deployed in the blockchain integrated station to determine whether the new version of disk image is deployed in the blockchain integrated station.

In an embodiment, after receiving the new hash value encrypted using the deployment key, the cryptographic acceleration card can obtain the new hash value in plaintext status by performing decryption using the deployment key determined in the above-mentioned key negotiation process in the TEE corresponding to the cryptographic acceleration card, and then replace the currently-stored old hash value with the new hash value. Thus, with the pre-deployed root-of-trust key, the temporarily-determined deployment key can be used in the transmission process of the new hash value, which not only ensures the privacy of the new hash value in the transmission process but also reduces the possibility that the root-of-trust key of the cryptographic acceleration card is leaked, thereby improving the security of the cryptographic acceleration card. In a case that a plurality of old versions of disk image respectively correspond to different new versions of disk image in the blockchain integrated station at the same time, the cryptographic acceleration card can establish an association relationship between a new hash value corresponding to any new version of disk image and a file identifier of the new version of disk image, and encrypt and store various new hash values according to respective association relationships, so as to specifically update any old hash value.

In this embodiment, the above-mentioned old hash value stored in the cryptographic acceleration card or the updated new hash value can both be used to verify whether the corresponding disk image is trusted before the corresponding disk image is executed. For example, before the old version of disk image and the old hash value are updated, a current hash value of the old version of disk image can be calculated and then compared with the old hash value: if a comparison result indicates that the current hash value is identical to the old hash value, it indicates that the old version of disk image locally deployed in the blockchain integrated station is the disk image provided by the provider, which is un-tampered and successfully deployed, and thus the old version of disk image is trusted. Therefore, the blockchain integrated station can execute the old version of disk image to form a blockchain node. On the contrary, if the comparison result indicates that the current hash value is different from the old hash value, it indicates that the old version of disk image locally deployed in the blockchain integrated station is not the disk image provided by the provider but can be illegally tampered or erroneously deployed, and thus the old version of disk image is not trusted. At this time, the blockchain integrated station can refuse to execute the old version of disk image. Similarly, after the old version of disk image and the old hash value are respectively updated to the new version of disk image and the new hash value, before the new version of disk image is executed, a current hash value of the new version of disk image can also be calculated to determine whether to execute, by the blockchain integrated station, the new version of disk image by determining whether the current hash value is identical to the above-mentioned new hash value in the same above-mentioned process.

Actually, since the cryptographic acceleration card is assembled in the blockchain integrated station, when the cryptographic acceleration card sends the negotiation information to the provider and when the provider sends the new hash value encrypted by the negotiated deployment key to the cryptographic acceleration card, the blockchain integrated station can forward the above-mentioned negotiation information and the new hash value in ciphertext status. FIG. 2 is a flowchart of another hash updating method of a blockchain integrated station according to example embodiments of the present disclosure. The method is applied to the blockchain integrated station. As shown in FIG. 2, the method can include the following steps.

At step 202, in response to negotiation information sent by a cryptographic acceleration card assembled on the blockchain integrated station, the blockchain integrated station forwards the negotiation information to a provider of a new version of disk image, such that the provider and the cryptographic acceleration card respectively determine a deployment key based on the negotiation information; where the new version of disk image is used to update an old version of disk image deployed in the blockchain integrated station.

At step 204, the blockchain integrated station forwards a new hash value corresponding to the new version of disk image and encrypted by the provider using the deployment key to the cryptographic acceleration card, such that the cryptographic acceleration card replaces a stored old hash value corresponding to the old version of disk image with the new hash value, where the new hash value is used to be compared with a current hash value of a disk image deployed in the blockchain integrated station to determine whether the new version of disk image is deployed in the blockchain integrated station.

In this embodiment, the cryptographic acceleration card forwards the negotiation information to the provider of the new version of disk image through the blockchain integrated station, such that a same deployment key is determined between the cryptographic acceleration card and the provider; after that, the provider forwards the new hash value encrypted by the deployment key to the cryptographic acceleration card through the blockchain integrated station, and the cryptographic acceleration card parses the new hash value with its own deployment key after receiving the new hash value and replaces the old hash value with the obtained new hash value, thereby realizing updating operation for the old hash value stored in the cryptographic acceleration card. The above-mentioned old hash value stored in the cryptographic acceleration card or the updated new hash value can both be used to verify whether the corresponding disk image is trusted before the corresponding disk image is executed. Reference can be made to the above-mentioned embodiments corresponding to FIG. 1 for the above-mentioned hash updating process and the updated image verification process and thus redundant descriptions will not be made herein.

In the above-mentioned embodiments of the present disclosure, the cryptographic acceleration card sends the negotiation information to the provider of the new version of disk image such that the cryptographic acceleration card and the provider determine a deployment key for encryption and transmission of the new hash value, to ensure the new hash value received by the cryptographic acceleration card is indeed a trusted hash value generated by the provider based on the new version of disk image and sent to the cryptographic acceleration card, thereby the old hash value corresponding to the old version of disk image and currently stored in the cryptographic acceleration card is updated. Further, it helps to realize trusted execution of the updated new version of disk image and trusted startup of the blockchain integrated station.

As mentioned above, the negotiation information and the new hash value transmitted between the cryptographic acceleration card and the provider can be directly transmitted between the cryptographic acceleration card and the provider or can be forwarded by the blockchain integrated station, which will be described below in combination with FIGS. 3 and 4.

Figure 4:
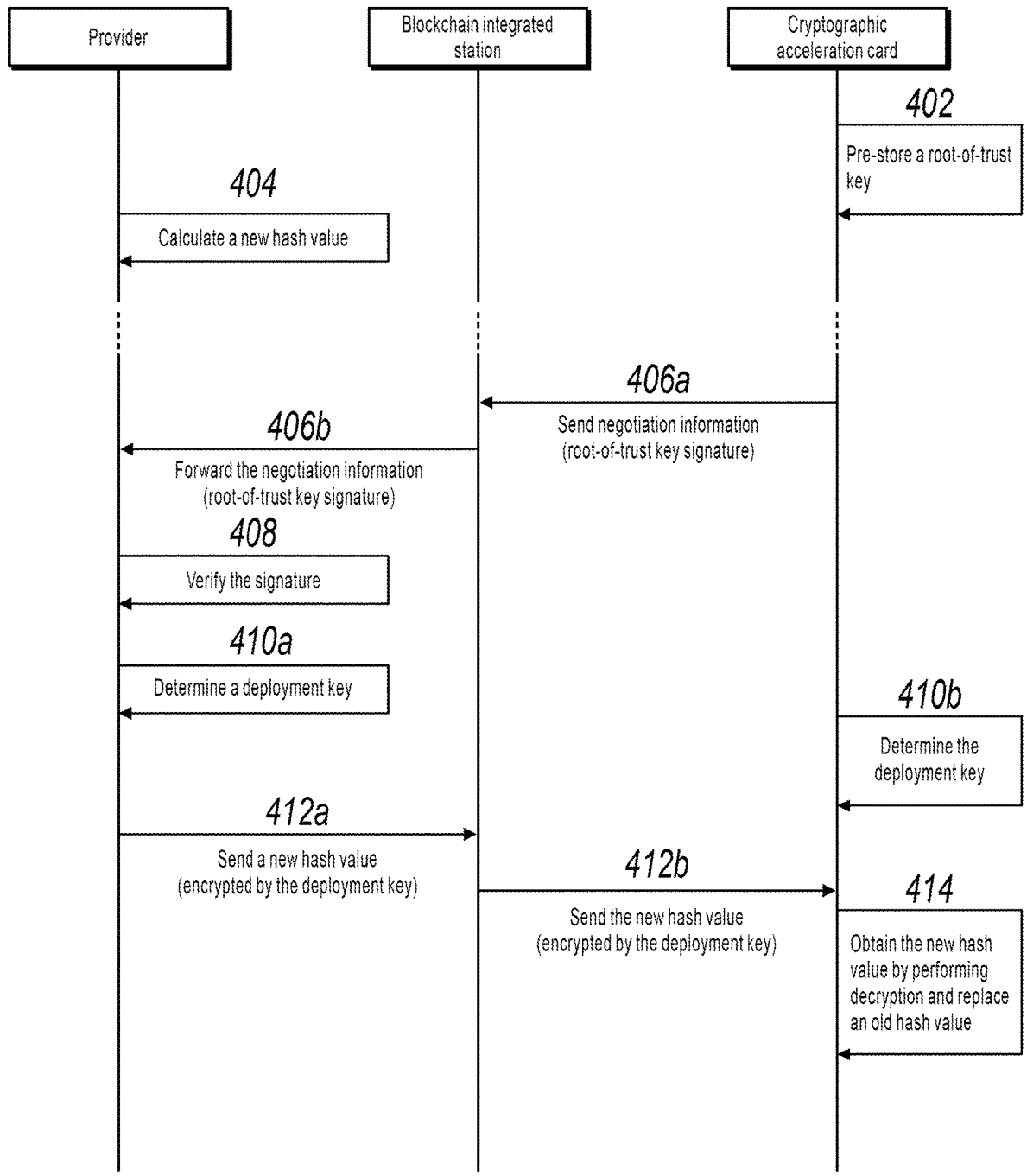
FIG. 4 is an interaction flowchart of another hash updating method of a blockchain integrated station according to example embodiments of the present disclosure.

FIG. 3 is an interaction flowchart of a hash updating method of a blockchain integrated station. In combination with FIG. 3, the process in which the old hash value stored in the cryptographic acceleration card is updated by directly sending data between the cryptographic acceleration card and the provider will be described below. As shown in FIG. 3, the process can include the following steps.

At step 302, a root-of-trust key is locally pre-stored in the cryptographic acceleration card.

In this embodiment, the cryptographic acceleration card can pre-store a root-of-trust key in a TEE. For example, the root-of-trust key can be pre-stored in the cryptographic acceleration card when the blockchain integrated station leaves factory or the root-of-trust key can be deployed into the cryptographic acceleration card by the blockchain integrated station or another object in an offline secure environment. For example, when the cryptographic acceleration card is a cryptographic acceleration card based on FPGA chip, the root-of-trust key can be programmed to be deployed into the FPGA structure of the cryptographic acceleration card, for example, programmed into a secure key zone of the e cryptographic acceleration card. However, due to volatility of the FPGA chip, the stored root-of-trust key will be lost upon power down, so that the cryptographic acceleration card needs to re-deploy the root-of-trust key after power up. To reduce the number of deployments of a client device, the FPGA structure can further include a memory connected with the FPGA chip, so that the root-of-trust key is deployed in the memory and the FPGA chip can read the root-of-trust key from the memory to realize relevant functions. Due to non-volatility of the memory, the memory can still store the root-of-trust key even upon power down, and the cryptographic acceleration card only needs to re-read the root-of-trust key from the memory to the FPGA chip after power up, without re-deploying. The above-mentioned memory can be in several forms, for example, can be a re-writable non-volatile memory such as flash memory, or can be a non-rewritable memory such as fuse memory, which will not be limited herein.

The above-mentioned the root-of-trust key is an asymmetric key and a public key corresponding to the root-of-trust key is disclosed or maintained only by the provider. In this case, even if the root-of-trust key is not deployed (pre-built by the provider, or deployed by another object) by the provider, the provider can still verify, by using the disclosed public key, a signature generated by the root-of-trust key. For example, the negotiation is realized based on SM2 algorithm (or another algorithm). In this case, the provider and the cryptographic acceleration card need to perform information interaction at least once during the negotiation process: when sending the negotiation information to the provider, the cryptographic acceleration card can sign the above-mentioned negotiation information using the above-mentioned root-of-trust key, so that the provider performs signature verification using the disclosed public key after receiving the signed negotiation information so as to determine the negotiation information is indeed sent by the cryptographic acceleration card and trusts the negotiation information; when the signature verification is unsuccessful, the provider can choose not to trust the received negotiation information. The above-mentioned verification process can be locally completed by the provider without assistance of any third party, which, on the one hand, reduces the number of verifications and improves the verification efficiency, and, on the other hand, avoids additional security risk caused by intervention of any third party or the increased number of interactions, thus ensuring the reliability of the verification result is not dependent on self-control and credibility of the third party.

At step 304, the provider of the new version of disk image calculates a new hash value corresponding to the new version of disk image in its own TEE.

In an embodiment, for the old version of disk image deployed in the blockchain integrated station, the provider can firstly determine the new version of disk image for updating the old version of disk image and then calculate the new hash value corresponding to the new version of disk image. The TEE can be locally deployed in the provider. At this time, a standard hash value can be calculated directly by the provider in the TEE. Alternatively, to reduce the calculation workload of the provider, the TEE can also be deployed in another component relating to the provider, and then the standard hash value is controlled to be calculated in the TEE by the provider and then encrypted and transmitted to the provider. Further, the above-mentioned new hash value can be calculated based on an algorithm such as SHA algorithm, MD4 algorithm, MD5 algorithm, ETHASH algorithm, and SCRYPT algorithm. The construction process of the above-mentioned TEE and the hash calculation process can be referred to the contents disclosed by the existing technology and thus will not be repeated herein.

Correspondingly, the old hash value stored in the cryptographic acceleration card can also be obtained by the provider by performing calculation based on the old version of disk image provided by the provider in the TEE. The hash algorithm adopted to calculate the old hash value according to the old version of disk image can be identical to or different from the hash algorithm adopted to calculate the new hash value according to the new version of disk image, which is not limited herein. Furthermore, the TEE corresponding to the provider and the cryptographic acceleration card can be constructed in several manners, for example, can be constructed based on Intel Software Guard Extensions (SGX) or based on AMD TrustZone, which is not limited herein.

The above-mentioned steps 302 and 304 both are pre-executed steps, and a time interval between the two steps 302 and 304 and the subsequent step 306 is not limited in the present disclosure. Actually, the step 304 can be performed at any time before step 312, for example, the corresponding new hash value can be calculated after the new version of disk image is generated or determined or after the deployment key between the provider and the cryptographic acceleration card is determined. Thus, the time of performing the step 304 is not limited in the present disclosure.

At step 306, the cryptographic acceleration card sends the negotiation information and a signature performed using the root-of-trust key to the provider.

In an embodiment, the cryptographic acceleration card can send the above-mentioned negotiation information to the provider after determining that hash updating needs to be performed. For example, before updating a disk image, the cryptographic acceleration card can proactively send an update inquiry message to the provider and determine whether to perform hash updating based on a confirmation message returned by the provider for the update inquiry message. For example, the cryptographic acceleration card can send the above-mentioned update inquiry message to the provider when the blockchain integrated station is started for running, or before the disk image is executed or according to a predetermined period (e.g. one day, one week or one month or the like), so as to know update needs for the disk image in time. For another example, before updating the disk image, the cryptographic acceleration card can determine hash updating is required after receiving an update notification for the disk image sent by the provider. For another example, when or after updating the disk image, the cryptographic acceleration card can determine hash updating is needed according to a detected update event of the disk image, and then send the above-mentioned negotiation information to the provider.

In an embodiment, the cryptographic acceleration card can generate the above-mentioned negotiation information in a trusted execution environment (TEE) corresponding to the cryptographic acceleration card in case of determining that hash updating is needed, and sign the negotiation information with the above-mentioned root-of-trust key and then send the negotiation information to the provider. For example, the cryptographic acceleration card can generate one random number S1 as its own private key and obtain a public key by performing modular exponentiation, and then sign parameters of the modular exponentiation and the above-mentioned public key by selecting a key exchange algorithm such as RSA, ECDSA or DSA or the like and then send the above-mentioned parameters, the public key and the signature to the provider in an associated manner. At this time, the negotiation information as above includes the parameters for performing modular exponentiation for the above-mentioned random number and the public key obtained by modular exponentiation.

At step 308, the provider verifies the signature of the negotiation information.

In an embodiment, the provider can verify the above-mentioned negotiation information based on a public key corresponding to the root-of-trust key maintained by the provider to ensure the privacy of the negotiation information during a transmission process. For example, the provider can realize verification of the signature without decrypting the signature (based on the feature of DH: only public keys are exchanged and encryption operation is performed) and the specific process can be referred to the contents disclosed by existing technology. Alternatively, the cryptographic acceleration card can first calculate a first information hash of the above-mentioned negotiation information using a particular hash algorithm, and then obtain the signature of the negotiation information by encrypting the first information hash using the above-mentioned root-of-trust key. Correspondingly, after receiving the above-mentioned negotiation information and the signature, the provider can firstly obtain a signature hash by decrypting the signature using a public key corresponding to the root-of-trust key maintained by the provider and calculate a second information hash of the above-mentioned negotiation information based on the same algorithm, and then determine, through comparison, whether the signature hash is identical to the second information hash: if the signature hash is identical to the second information hash, it is determined that the above-mentioned signature is successfully verified; otherwise, if the signature hash is different from the second information hash, it is determined that the above-mentioned signature is unsuccessfully verified. The above-mentioned comparison can be performed in a full text bit-by-bit comparison manner, that is, the bits of the signature hash and the second information hash are compared bit by bit along a predetermined direction: if the values of all bits of the signature hash are correspondingly equal to the values of all bits of the second information hash, it is determined that the signature hash and the second information hash are same; on the contrary, if the value of any bit of the signature hash is unequal to the value of the corresponding bit of the second information hash, it is determined that the signature hash and the second information hash are not same.

In a case of successful verification of the above-mentioned signature, it is determined that the negotiation information is indeed sent by the cryptographic acceleration card and trusted, and the deployment key is further determined by performing step 310*a*. In a case of unsuccessful verification of the above-mentioned signature, it indicates that the negotiation information may not be sent by the cryptographic acceleration card or can be sent by the cryptographic acceleration card but tampered by any third party. Thus, the provider can choose not to trust the negotiation information. At this time, the negotiation information can be directly discarded and/or a warning is initiated for the negotiation information.

At step 310*a*, the provider determines a deployment key according to the negotiation information.

At step 310*b*, the cryptographic acceleration card determines a deployment key according to the negotiation information.

The provider and the cryptographic acceleration card can respectively determine their own deployment keys according to the negotiation information. Continued from the embodiment of the previous step 306, correspondingly, after receiving the above-mentioned negotiation information, the provider can generate a random number S2 based on the above-mentioned negotiation information in a case of successful signature verification, and return a public key encrypted by the random number S2 to the cryptographic acceleration card. In this way, the cryptographic acceleration card and the provider can respectively generate a same deployment key based on the above-mentioned process. The specific process of the above-mentioned negotiation can be referred to the contents disclosed by the existing technology and will not be repeated herein.

Eventually, the provider and the cryptographic acceleration card can respectively obtain the same deployment key, or obtain a private key and a public key of a pair of asymmetric keys, thus completing the key negotiation process.

At step 312, the provider sends a new hash value encrypted using the deployment key to the cryptographic acceleration card.

At step 314, the cryptographic acceleration card obtains the new hash value by performing decryption using its own deployment key and replaces an old hash value currently stored in the cryptographic acceleration card with the new hash value.

In this embodiment, after determining the deployment key, the provider can encrypt the new hash value obtained at step 304 by using the deployment key, and then send the encrypted new hash value to the cryptographic acceleration card. Correspondingly, after receiving the new hash value in ciphertext status, the cryptographic acceleration card can decrypt the new hash value in ciphertext status using the deployment key determined in the above-mentioned key negotiation process in the TEE corresponding to the cryptographic acceleration card so as to obtain the new hash value in plaintext status.

In this embodiment, the cryptographic acceleration card can replace the locally-stored old hash value with the new hash value in plaintext status. For example, the cryptographic acceleration card can write the new hash value into a storage space corresponding to the old hash value in its secure key zone, or FPGA chip or memory connected with the FPGA chip, so as to overwrite the old hash value in corresponding position to update the old hash value.

In an embodiment, after receiving the new hash value in ciphertext status, the cryptographic acceleration card does not directly decrypt the new hash value but stores the new hash value in the ciphertext status into the secure key zone, FPGA chip or the memory connected with the FPGA chip, and decrypts the new hash value using the deployment key only when the new hash value is invoked for use, thereby avoiding possible hash leakage caused by earlier decryption of the new hash value. Further, the new hash value in ciphertext status can be stored in a non-TEE storage space to reduce the occupation of the new hash value for the storage space corresponding to TEE.

The above-mentioned old hash value corresponds to the old version of disk image before update in the blockchain integrated station and the new hash value corresponds to the updated new version of disk image in the blockchain integrated station. The updated new hash value can be used to verify whether the new version of disk image in the blockchain integrated station is a trusted disk image provided by the provider so as to realize trusted execution of the new version of disk image and trusted startup of blockchain integrated station. For example, the blockchain integrated station can calculate the current hash value of the new version of disk image and send the current hash value to the cryptographic acceleration card for comparison with the new hash value in the cryptographic acceleration card: if a comparison result indicates that the current hash value is identical to the new hash value, it indicates that the new version of disk image deployed locally in the blockchain integrated station is the disk image provided by the provider, which is un-tampered and successfully deployed, and thus the new version of disk image is trusted. In this case, the blockchain integrated station can execute the new version of disk image to form a blockchain node. On the contrary, if the comparison result indicates that the current hash value is different from the new hash value, it indicates that the new version of disk image deployed locally in the blockchain integrated station is not the disk image provided by the provider but can be illegally-tampered or erroneously-deployed disk image and thus the new version of disk image is not trusted. At this time, the blockchain integrated station can refuse to execute the new version of disk image.

Since the cryptographic acceleration card is assembled in the blockchain integrated station, when the cryptographic acceleration card sends the negotiation information to the provider and the provider sends the new hash value encrypted by the negotiated deployment key to the cryptographic acceleration card, the blockchain integrated station can forward the above-mentioned negotiation information and the new hash value in ciphertext status. FIG. 4 is an interaction flowchart of another hash updating method of a blockchain integrated station according to example embodiments of the present disclosure. In combination with FIG. 4, the process in which the old hash value stored in the cryptographic acceleration card is updated by forwarding data through the blockchain integrated station between the cryptographic acceleration card and the provider will be described below. As shown in FIG. 4, the process can include the following steps.

At step 402, the cryptographic acceleration card locally pre-stores a root-of-trust key.

At step 404, the provider of the new version of disk image calculates the new hash value in its own TEE according to the new version of disk image.

At step 406a, the cryptographic acceleration card sends negotiation information and a signature performed using the root-of-trust key to the blockchain integrated station.

At step 406b, the blockchain integrated station forwards the negotiation information and the signature performed using the root-of-trust key to the provider.

In the steps 406a-406b, the negotiation information and the signature performed using the root-of-trust key are forwarded through the blockchain integrated station to the provider, so that the cryptographic acceleration card and the provider are connected through the blockchain integrated station.

At step 408, the provider verifies the signature of the negotiation information.

At step 410, the provider determines a deployment key according to the negotiation information.

At step 412a, the provider sends a new hash value encrypted by the deployment key to the blockchain integrated station.

At step 412b, the blockchain integrated station forwards the new hash value encrypted by the deployment key to the cryptographic acceleration card.

In the steps 412a-412b, the new hash value encrypted by the deployment key is forwarded through the blockchain integrated station to the cryptographic acceleration card, so that the cryptographic acceleration card and the provider are connected through the blockchain integrated station.

At step 414, the cryptographic acceleration card obtains the new hash value by performing decryption using its own deployment key and replaces a currently-stored old hash value with the new hash value.

The above-mentioned specific process of various steps in this embodiment is basically identical to step 314 of the embodiment shown in FIG. 3 and thus can referred to the previous descriptions and will not be repeated herein.

Figure 5:
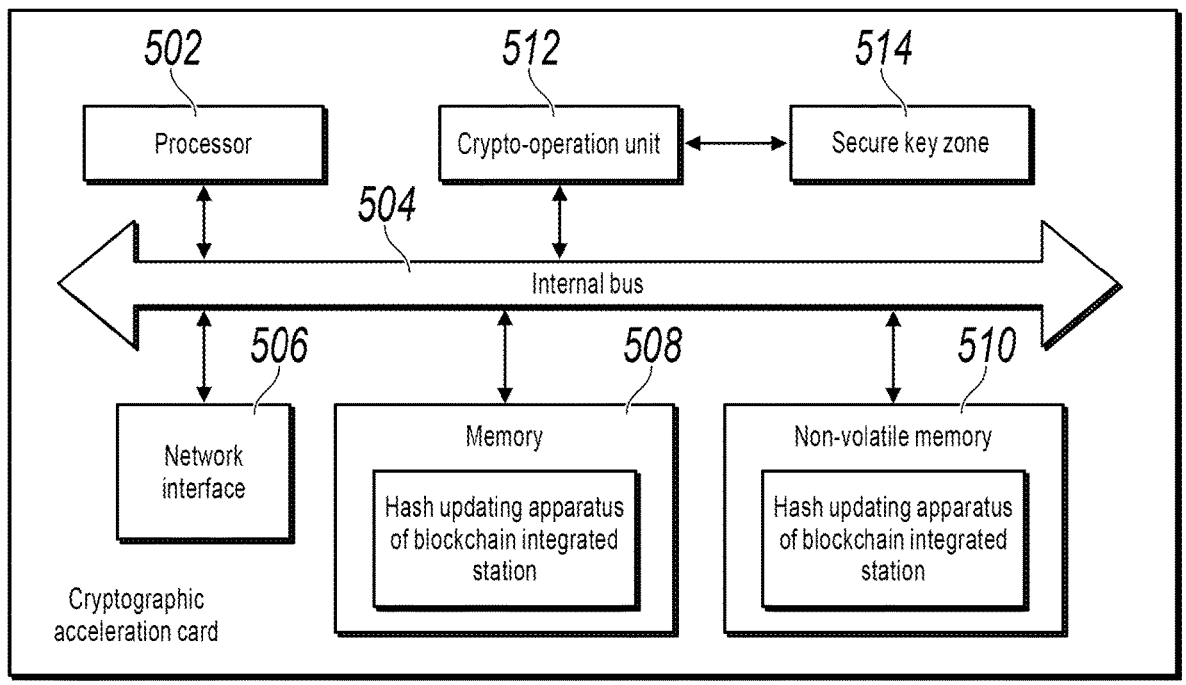
FIG. 5 is a structural schematic diagram of a cryptographic acceleration card according to example embodiments of the present disclosure.

FIG. 5 is a structural schematic diagram of a cryptographic acceleration card according to example embodiments of the present disclosure. As shown in FIG. 5, from the hardware level, the device includes a processor 502, an internal bus 504, a network interface 506, a memory 508, a non-volatile memory 510, a crypto-operation unit 512 and a secure key zone 514. Of course, the device may further include hardware needed for other services. The crypto-operation unit 512 stores received or generated relevant keys in the secure key zone 514 so that the processor 502 invokes the keys to realize relevant functions such as encryption, decryption, signature obtaining and/or signature verification. The processor 502 reads corresponding computer programs from the non-volatile memory 510 to the memory 508 for running, so as to logically form a hash updating apparatus of a blockchain integrated station. Of course, in addition to the software implementation, one or more embodiments of the present disclosure do not preclude other implementations, for example, logic device or a combination of software and hardware or the like. That is, the executing subject of the following processing flow is not limited to each logic unit and can also be hardware or logic device.

Figure 6:
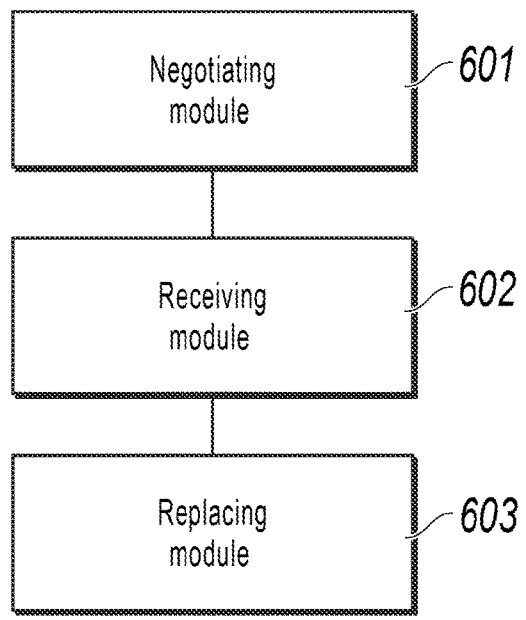
FIG. 6 is a block diagram of a hash updating apparatus of a blockchain integrated station according to example embodiments of the present disclosure.

As shown in FIG. 6, in a software implementation, a hash updating apparatus of a blockchain integrated station can include:

a negotiating module 601, configured to enable a cryptographic acceleration card assembled on the blockchain integrated station to send negotiation information to a provider of a new version of disk image, where the negotiation information is used respectively by the provider and the cryptographic acceleration card to determine a deployment key, and the new version of disk image is used to update an old version of disk image deployed in the blockchain integrated station;

a receiving module 602, configured to enable the cryptographic acceleration card to receive a new hash value encrypted by the provider using the deployment key, where the new hash value corresponds to the new version of disk image; and a replacing module 603, configured to enable the cryptographic acceleration card to replace a stored old hash value corresponding to the old version of disk image with the new hash value, where the new hash value is used to be compared with a current hash value of a disk image deployed in the blockchain integrated station to determine whether the new version of disk image is deployed in the blockchain integrated station.

Optionally, the disk image deployed in the blockchain integrated station includes:

a binary disk image corresponding to a blockchain node and deployed in the blockchain integrated station; or, a platform disk image deployed in the blockchain integrated station, wherein the platform disk image includes the binary disk image.

Optionally, the replacing module 603 is further configured to enable:

the cryptographic acceleration card to obtain the new hash value by performing decryption using the deployment key after receiving the new hash value encrypted using the deployment key;

the cryptographic acceleration card to replace the stored old hash value with the new hash value.

Optionally, the old hash value and the new hash value are calculated and generated in a trusted execution environment using the old version of disk image and new version of disk image provided by the provider, respectively.

Optionally, the negotiation information is signed by a root-of-trust key pre-stored in the cryptographic acceleration card, where a public key corresponding to the root-of-trust key is disclosed or the public key corresponding to the root-of-trust key is maintained only by the provider.

Figure 7:
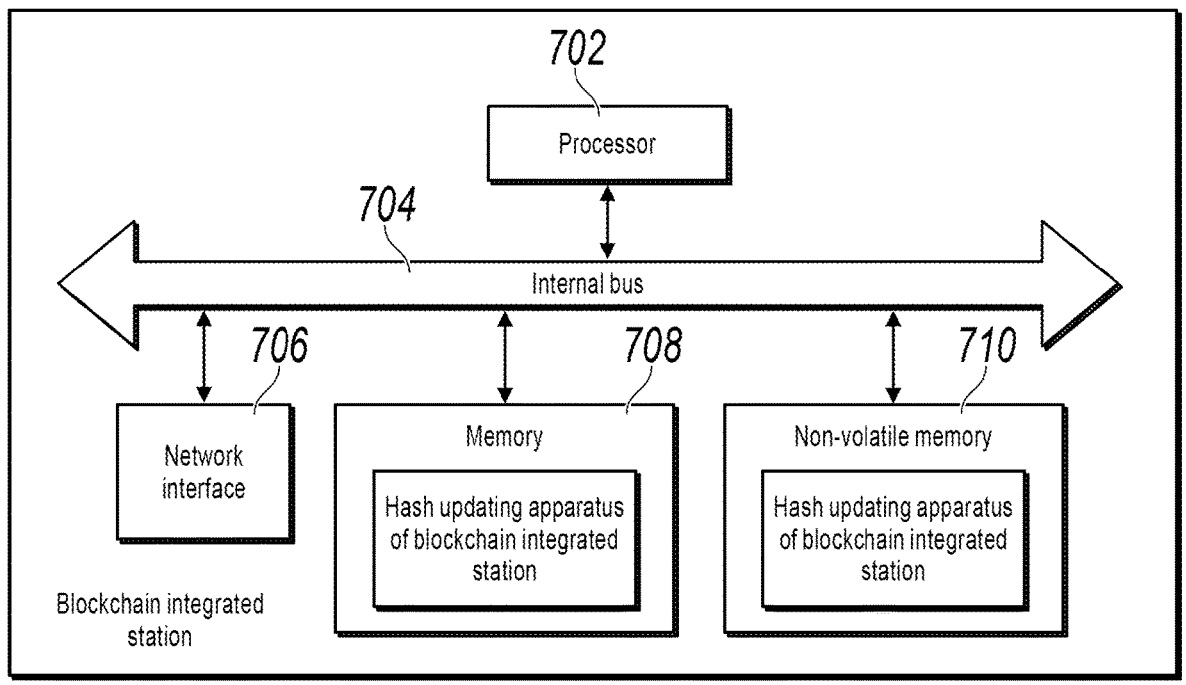
FIG. 7 is a structural schematic diagram of a blockchain integrated station according to example embodiments of the present disclosure.

FIG. 7 is a structural schematic diagram of a blockchain integrated station according to example embodiments of the present disclosure. As shown in FIG. 7, from the hardware level, the device includes a processor 702, an internal bus 704, a network interface 706, a memory 708, and a non-volatile memory 710. Of course, the device may further include hardware needed for other services. The processor 702 reads corresponding computer programs from the non-volatile memory 710 to the memory 708 for running, so as to logically form a hash updating apparatus of a blockchain integrated station. Of course, in addition to the software implementation, one or more embodiments of the present disclosure do not preclude other implementations, for example, logic device or a combination of software and hardware or the like. That is, the executing subject of the following processing flow is not limited to each logic unit and can also be hardware or logic device.

Figure 8:
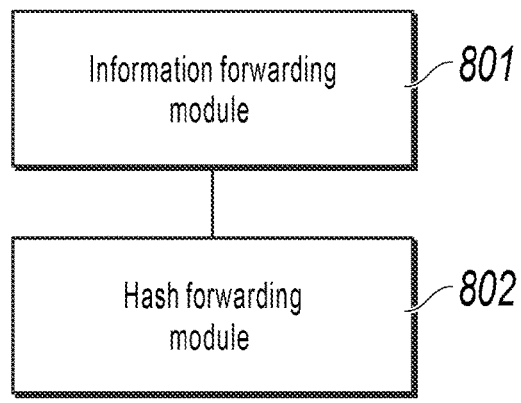
FIG. 8 is a block diagram of another hash updating apparatus of a blockchain integrated station according to example embodiments of the present disclosure.

As shown in FIG. 8, in a software implementation, a hash updating apparatus of a blockchain integrated station can include:

an information forwarding module 801, configured to, in response to negotiation information sent by a cryptographic acceleration card assembled on the blockchain integrated station, enable the blockchain integrated station to forward the negotiation information to a provider of a new version of disk image, such that the provider and the cryptographic acceleration card respectively determine a deployment key based on the negotiation information; where the new version of disk image is used to update an old version of disk image deployed in the blockchain integrated station; and a hash forwarding module 802, configured to enable the blockchain integrated station to forward a new hash value corresponding to the new version of disk image and encrypted by the provider using the deployment key to the cryptographic acceleration card, such that the cryptographic acceleration card replaces a stored old hash value corresponding to the old version of disk image with the new hash value, wherein the new hash value is used to be compared with a current hash value of a disk image deployed in the blockchain integrated station to determine whether the new version of disk image is deployed in the blockchain integrated station.

Optionally, the disk image deployed in the blockchain integrated station includes:

a binary disk image corresponding to a blockchain node and deployed in the blockchain integrated station; or, a platform disk image deployed in the blockchain integrated station, where the platform disk image includes the binary disk image.

Optionally, the old hash value and the new hash value are calculated and generated in a trusted execution environment using the old version of disk image and new version of disk image provided by the provider, respectively.

Optionally, the negotiation information is signed by a root-of-trust key pre-stored in the cryptographic acceleration card, where a public key corresponding to the root-of-trust key is disclosed or the public key corresponding to the root-of-trust key is maintained by the provider.

The systems, apparatuses, modules or units described in the above-mentioned embodiments can be specifically implemented by a computer chip or an entity or can be implemented by a product with a particular function. A typical implementing device can be a computer and the computer can be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the above-mentioned devices.

In a typical configuration, the computer includes one or more central processing units (CPU), one or more input/output interfaces, one or more network interfaces and one or more memories.

The memory may include a non-permanent memory, a random access memory (RAM), and/or a non-volatile memory and the like in a computer readable medium, for example, read only memory (ROM), or flash RAM. The memory is one embodiment of the computer readable medium.

The computer readable medium includes transitory, non-transitory, portable and non-portable media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technologies, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements in a process, method, product or device including the elements.

The specific embodiments are described as above. Other embodiments be are within the scope of the appended claims. In some cases, the actions or steps recorded in the claims can be performed in a sequence different from the embodiments to achieve the desired result. Further, the processes shown in drawings do not necessarily require a particular sequence or a continuous sequence shown to achieve the desired result. In some embodiments, a multi-task processing and parallel processing are possible and can also be advantageous.

The terms used in one or more embodiments of the present disclosure are for the purpose of describing particular embodiments only, and are not intended to limit the one or more embodiments of the present disclosure. Terms "a", "the" and "said" used in their singular forms in one or more embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in one or more embodiments of the present disclosure to describe various information, such information should not be limited to these terms. These terms are only used to distinguish one category of information from another. For example, without departing from the scope of one or more embodiments of the present disclosure, first information can be referred as second information; and similarly, the second information can also be referred as the first information. Depending on the context, the term "if" as used herein can be interpreted as "when" or "upon" or "in response to determining".

The above-mentioned disclosure is merely illustrative of preferred embodiments of one or more embodiments of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A cryptographic acceleration card comprising:
at least one processor; and
one or more memories coupled to the at least one processor and storing programming instructions for execution by the at least one processor to perform one or more operations comprising:
sending, by the cryptographic acceleration card comprised in a blockchain integrated station, negotiation information to a provider of a new disk image, wherein the negotiation information is used by the provider to determine a deployment key, and wherein the new disk image is used to update an old disk image comprised in the blockchain integrated station;
receiving, by the cryptographic acceleration card, a new hash value encrypted by the provider using the deployment key, wherein the new hash value corresponds to the new disk image; and
replacing, by the cryptographic acceleration card, an old hash value corresponding to the old disk image with the new hash value, wherein the new hash value is compared with a current hash value of a disk image comprised in the blockchain integrated station to determine whether the disk image matches the new disk image.

2. The cryptographic acceleration card of claim 1, wherein the disk image comprises at least one of:
a binary disk image, wherein when the binary disk image is executed, one or more functions of a blockchain node are added to the blockchain integrated station; or
a platform disk image comprising the binary disk image, wherein when the platform disk image is executed, one or more functions of a blockchain node and one or more additional functions different than the one or more functions of the blockchain node are added to the blockchain integrated station.

3. The cryptographic acceleration card of claim 1, the operations comprising:
generating, by the cryptographic acceleration card, a first random number;
performing, based on the first random number, an operation of modular exponentiation to generate a public key; and
including the public key and one or more parameters associated with the operation of modular exponentiation in the negotiation information.

4. The cryptographic acceleration card of claim 1, wherein the replacing comprises:
determining, by the cryptographic acceleration card, an additional deployment key that is same as the deployment key; and
decrypting, by the cryptographic acceleration card, the new hash value using the additional deployment key.

5. The cryptographic acceleration card of claim 1, the operations comprising:
signing, by the cryptographic acceleration card, the negotiation information using a root-of-trust key pre-stored in the cryptographic acceleration card to generate a signature, wherein the signature is verified by the provider using a public key corresponding to the root-of-trust key.

6. The cryptographic acceleration card of claim 1, the operations comprising, before the sending:
sending, by the cryptographic acceleration card, an inquiry message to the provider;
receiving, by the cryptographic acceleration card and from the provider, a confirmation message in response to the inquiry message; and
determining, by the cryptographic acceleration card and based on the confirmation message, that the old hash value needs to be updated.

7. The cryptographic acceleration card of claim 6, wherein sending the inquiry message comprises at least one of:
sending the inquiry message when the blockchain integrated station is started;
sending the inquiry message before the new disk image is executed; or
sending the inquiry message according to a predetermined period.

8. A computer-implemented method comprising:
sending, by a cryptographic acceleration card comprised in a blockchain integrated station, negotiation information to a provider of a new disk image, wherein the negotiation information is used by the provider to determine a deployment key, and wherein the new disk image is used to update an old disk image comprised in the blockchain integrated station;

receiving, by the cryptographic acceleration card, a new hash value encrypted by the provider using the deployment key, wherein the new hash value corresponds to the new disk image; and replacing, by the cryptographic acceleration card, an old hash value corresponding to the old disk image with the new hash value, wherein the new hash value is compared with a current hash value of a disk image comprised in the blockchain integrated station to determine whether the disk image matches the new disk image.

9. The computer-implemented method of claim 8, wherein the disk image comprises at least one of:
a binary disk image, wherein when the binary disk image is executed, one or more functions of a blockchain node are added to the blockchain integrated station; or
a platform disk image comprising the binary disk image, wherein when the platform disk image is executed, one or more functions of a blockchain node and one or more additional functions different than the one or more functions of the blockchain node are added to the blockchain integrated station.

10. The computer-implemented method of claim 8, comprising:
generating, by the cryptographic acceleration card, a first random number;
performing, based on the first random number, an operation of modular exponentiation to generate a public key; and
including the public key and one or more parameters associated with the operation of modular exponentiation in the negotiation information.

11. The computer-implemented method of claim 8, wherein the replacing comprises:
determining, by the cryptographic acceleration card, an additional deployment key that is same as the deployment key; and
decrypting, by the cryptographic acceleration card, the new hash value using the additional deployment key.

12. The computer-implemented method according to claim 8, comprising:
signing, by the cryptographic acceleration card, the negotiation information using a root-of-trust key pre-stored in the cryptographic acceleration card to generate a signature, wherein the signature is verified by the provider using a public key corresponding to the root-of-trust key.

13. The computer-implemented method of claim 8, comprising, before the sending:
sending, by the cryptographic acceleration card, an inquiry message to the provider;
receiving, by the cryptographic acceleration card and from the provider, a confirmation message in response to the inquiry message; and
determining, by the cryptographic acceleration card and based on the confirmation message, that the old hash value needs to be updated.

14. The computer-implemented method of claim 13, wherein sending the inquiry message comprises at least one of:
sending the inquiry message when the blockchain integrated station is started;
sending the inquiry message before the new disk image is executed; or
sending the inquiry message according to a predetermined period.

15. A computer-implemented system comprising:
one or more blockchain integrated stations; and
one or more computer memory devices coupled with the one or more blockchain integrated stations and having tangible, non-transitory, machine-readable media storing one or more instructions that, when executed by the one or more blockchain integrated stations, perform one or more operations comprising:
sending, by a cryptographic acceleration card comprised in a blockchain integrated station, negotiation information to a provider of a new disk image, wherein the negotiation information is used by the provider to determine a deployment key, and wherein the new disk image is used to update an old disk image comprised in the blockchain integrated station;
receiving, by the cryptographic acceleration card, a new hash value encrypted by the provider using the deployment key, wherein the new hash value corresponds to the new disk image; and
replacing, by the cryptographic acceleration card, an old hash value corresponding to the old disk image with the new hash value, wherein the new hash value is compared with a current hash value of a disk image comprised in the blockchain integrated station to determine whether the disk image matches the new disk image.

16. The computer-implemented system of claim 15, wherein the disk image comprises at least one of:
a binary disk image, wherein when the binary disk image is executed, one or more functions of a blockchain node are added to the blockchain integrated station; or
a platform disk image comprising the binary disk image, wherein when the platform disk image is executed, one or more functions of a blockchain node and one or more additional functions different than the one or more functions of the blockchain node are added to the blockchain integrated station.

17. The computer-implemented system of claim 15, the operations comprising:
generating, by the cryptographic acceleration card, a first random number;
performing, based on the first random number, an operation of modular exponentiation to generate a public key; and
including the public key and one or more parameters associated with the operation of modular exponentiation in the negotiation information.

18. The computer-implemented system of claim 15, wherein the replacing comprises:
determining, by the cryptographic acceleration card, an additional deployment key that is same as the deployment key; and
decrypting, by the cryptographic acceleration card, the new hash value using the additional deployment key.

19. The computer-implemented system of claim 15, the operations comprising:
signing, by the cryptographic acceleration card, the negotiation information using a root-of-trust key pre-stored in the cryptographic acceleration card to generate a signature, wherein the signature is verified by the provider using a public key corresponding to the root-of-trust key.

20. The computer-implemented system of claim 15, the operations comprising, before the sending:
sending, by the cryptographic acceleration card, an inquiry message to the provider;

receiving, by the cryptographic acceleration card and from the provider, a confirmation message in response to the inquiry message; and determining, by the cryptographic acceleration card and based on the confirmation message, that the old hash value needs to be updated.

\* \* \* \* \*